United States Patent
Xu et al.

(10) Patent No.: US 12,533,743 B1
(45) Date of Patent: Jan. 27, 2026

(54) BACKING WELDING PROCESS CURVE BASED ON NARROW-GAP U-GROOVE AND ITS APPLICATION AND PRODUCT

(71) Applicant: Tianjin University, Tianjin (CN)

(72) Inventors: Lianyong Xu, Tianjin (CN); Kangda Hao, Tianjin (CN); Yongdian Han, Tianjin (CN); Lei Zhao, Tianjin (CN); Wenjing Ren, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 19/239,988

(22) Filed: Jun. 17, 2025

(30) Foreign Application Priority Data

Nov. 29, 2024 (CN) .......................... 202411739906.5

(51) Int. Cl.
*B23K 9/09* (2006.01)
*B23K 101/10* (2006.01)
*B23K 103/04* (2006.01)

(52) U.S. Cl.
CPC .......... *B23K 9/092* (2013.01); *B23K 2101/10* (2018.08); *B23K 2103/04* (2018.08)

(58) Field of Classification Search
CPC . B23K 9/092; B23K 2103/04; B23K 2101/10
See application file for complete search history.

(56) References Cited

U.S. PATENT DOCUMENTS

| | | | | |
|---|---|---|---|---|
| 5,030,812 A * | 7/1991 | Sugitani | ............... | B23K 9/0216 219/61 |
| 5,945,014 A * | 8/1999 | Crockett | ................... | B23K 9/02 219/73 |
| 6,410,876 B1 * | 6/2002 | Rinaldi | ................ | B23K 9/0286 219/61 |
| 6,518,545 B1 * | 2/2003 | Richard | ............... | B23K 9/1062 219/130.21 |
| 8,610,031 B2 * | 12/2013 | Peters | ....................... | B23K 9/09 219/130.01 |
| 2009/0045172 A1 * | 2/2009 | Van Erk | ................ | B32B 15/011 219/61 |
| 2011/0108527 A1 * | 5/2011 | Peters | ....................... | B23K 9/09 219/74 |
| 2024/0307990 A1 * | 9/2024 | Takada | ..................... | B23K 9/16 |

* cited by examiner

*Primary Examiner* — Brian W Jennison
(74) *Attorney, Agent, or Firm* — JCIPRNET (57) ABSTRACT

A backing welding process curve based on a narrow-gap U-groove and its application and product are provided. The backing welding process curve is used for welding the narrow-gap U-groove. On the basis of a CMT reference curve, at least one current pulse is introduced before and after the short-circuiting phase respectively, to increase the root weld width and avoid root concavity. Meanwhile, the peak current and cycle time are increased to enhance welding heat input, while the peak current rise rate and peak current fall rate are reduced to prolong the peak current action time.

2 Claims, 7 Drawing Sheets

BACKING WELDING PROCESS CURVE BASED ON NARROW-GAP U-GROOVE AND ITS APPLICATION AND PRODUCT

CROSS-REFERENCE TO RELATED APPLICATION

This application claims the priority benefit of China application serial no. 202411739906.5, filed on Nov. 29, 2024, now allowed. The entirety of the above-mentioned patent application is hereby incorporated by reference herein and made a part of this specification.

TECHNICAL FIELD

The present disclosure belongs to the field of submarine pipeline welding, particularly a backing welding process curve based on a narrow-gap U-groove and its application and product.

BACKGROUND

China's South China Sea features complex and harsh geological conditions, with oil and gas reserves containing high acidic medium such as $H_2S/CO_2$. The extraction of high-sulfur hydrocarbons is a critical part of offshore oil and gas resource development. Carbon steel subsea pipelines (projects in the Middle East and Thailand) face strongly coupled multi-factor challenges, including low temperatures, severe hydrogen sulfide corrosion, and fatigue loads. Welding technology for acid-resistant carbon steel subsea pipelines serves as a vital safeguard for ensuring their long-term service safety.

During the traditional offshore pipeline laying process, copper backing is often used for high-quality root weld formation. Although copper backing improves the formation effect, a significant amount of copper infiltrates into the weld. As is well known, copper has superior corrosion resistance compared to iron. The infiltration of copper into the pipeline forms a galvanic couple, and due to its higher corrosion potential, the copper accelerates the corrosion dissolution of the pipeline (Fe), severely degrading the service life of the pipeline in acidic environments. Therefore, there is an urgent need to develop a back-welding process that achieves single-sided welding with double-sided formation without copper backing and with excellent root formation.

The backside welding processes for single-sided welding with double-sided forming mainly include Surface Tension Transfer (STT) and Cold Metal Transfer (CMT). STT technology requires maintaining a certain gap in the pipeline during backside welding, which makes the process difficult to control. Additionally, STT equipment is costly. CMT technology features low beat input and stable, reliable welding performance. It enables all-position welding of pipelines even with zero gap. However, it also faces challenges, including poor adaptability to misalignment due to the narrow weld bead caused by low heat input. Moreover, in the overhead welding position, the gravity of the molten pool can easily lead to root concavity. Root concavity weakens the strength of the pipeline joint, creates stress concentration, and reduces the reliability of the weld joint.

Additionally, resistance to $H_2S$ stress corrosion cracking is one of the key service performance indicators for acid-resistant marine pipeline. This property is closely related to the hardness of the welded joint, which is typically required to have a maximum hardness of ≤248 HV. Using high heat input welding is generally the most effective way to reduce joint hardness. However, in existing backing welding processes, high heat input usually results in thicker weld beads, preventing sufficient heat transfer to the root and leading to excessive hardness in the root weld. If low heat input parameters are used to reduce weld bead thickness, incomplete penetration defects may occur. Moreover, low heat input increases the cooling rate of the molten pool, resulting in the formation of martensite and causing the hardness of the root weld to rise instead of decreasing.

SUMMARY

This disclosure provides a backing welding process curve based on a narrow-gap U-groove and its application and product, aiming to solve issues in the backing welding of acid-resistant marine pipeline such as inadequate heat transfer to the root, root concavity, and backing weld bead with excessive hardness, leading to SSC (stress corrosion cracking) performance failure.

According to one aspect of the disclosure, a backing welding process curve based on a narrow-gap U-groove is provided. The backing welding process curve is used for welding the narrow-gap U-groove and, on the basis of the CMT reference curve, introduces at least one current pulse before and after the short-circuiting phase to increase root fusion width and avoid root concavity. Simultaneously, it increases the peak current and cycle time to increase welding heat input, and reduces the peak current rise rate and the peak current fall rate to prolong the peak current action time.

This disclosure introduces current pulses and optimizes multiple parameters to increase welding beat input and root fusion width. Excellent single-sided welding with double-sided forming can be achieved even under zero-gap assembly, thereby improving the SSC performance of acid-resistant marine pipeline.

Preferably, the root face thickness b of said narrow-gap U-groove is 1.45±0.1 mm, the single-side groove angle α is 3±0.5", and the distance a between the transition arc top and root face is 2.95±0.1 mm.

Preferably, compared to the CMT reference curve, said backing welding process curve increases the peak current by 30% to 50%.

Preferably, compared to the CMT reference curve, the backing welding process curve increases the cycle time by 300% to 500%.

Preferably, compared to the CMT reference curve, the said backing welding process curve reduces the peak current rise rate by 30% to 50%.

Preferably, compared to the CMT reference curve, the said backing welding process curve reduces the peak current fall rate by 20% to 40%.

Preferably, two current pulses are introduced before and after the short-circuit phase respectively.

Preferably, the duration of an introduced single current pulse is 5.5 ms to 7.5 ms, and the pulse peak current is 220 A to 300 A.

According to another aspect of the disclosure, it provides a backing welding method for an acid-resistant marine pipeline, wherein a groove of a pipeline to be welded is first designed as a narrow-gap U-shaped groove, and then welding is performed using the aforementioned backing welding process curve.

According to another aspect of the disclosure, an acid-resistant marine pipeline is provided using the aforementioned backing welding method.

In general, the disclosure has the following beneficial effects:

1. The disclosure optimizes the backing welding process curve, which can increase welding heat input and root fusion width. It achieves excellent single-sided welding with double-sided forming even under zero-gap assembly and without backing plates. Even in the overhead welding position, a root pass with certain reinforcement can be obtained, addressing weld defect issues. This significantly reduces assembly difficulty, improves backing welding adaptability for misalignment, and facilitates energy transfer to the root zone, ensuring sufficient cooling and solidification of the molten pool. It also reduces backing weld hardness and enhances the service performance of acid-resistant marine pipeline.

2. In particular, the disclosure optimizes the sizes of the U-shaped groove, making the bottom wider and the top narrower compared to existing grooves. This reduces the thickness of the backing weld, allowing arc energy to reach the root more easily and lowering the cooling rate of the molten pool. As a result, it prevents lack of penetration defects while reducing the hardness of the backing weld. Additionally, it avoids the defect of non-fusion on the sidewalls caused by insufficient fluidity of the molten pool during welding.

3. Furthermore, the disclosure optimizes specific parameters of the backing welding process curve, which can further enhance the service performance of acid-resistant marine pipeline.

DETAILED DESCRIPTION OF THE EMBODIMENTS

In order to make the disclosure clearer and more comprehensible, the disclosure is further described in detail with reference to the drawings and embodiments. It should be understood that the specific embodiments described herein serve to explain the disclosure merely and are not used to limit the disclosure.

According to one aspect of the disclosure, a backing welding process curve based on a narrow-gap U-shaped groove is provided for welding the narrow-gap U-shaped groove. Based on CMT reference curve, at least one current pulse is introduced before and after the short-circuiting phase respectively. The pulse current introduced before the short-circuiting phase is to increase welding heat input and thermal coverage range, thereby increasing root fusion width and improving adaptability for misalignment of backing welding. The pulse current introduced after the short-circuiting phase prolong the duration of arc pressure action time, facilitating the flow of molten pool toward the root. This specifically addresses the root concavity caused by gravity-induced sagging of the metal in the molten pool, particularly in overhead welding positions, enabling the formation of a root pass with a certain reinforcement. Additionally, peak current and cycle time are increased to enhance welding heat input, while the peak current rise rate and peak current fall rate are reduced to prolong the peak current action time. This ensures that the additional heat input more easily reaches the root, simultaneously increasing both root fusion width and reinforcement while reducing the cooling rate of the molten pool. Consequently, the hardness of the backing weld is reduced, ultimately improving the $H_2S$ stress corrosion resistance of the acid-resistant marine pipeline.

The disclosure optimizes the backing welding process curve, which increases welding heat input and root fusion width, achieving excellent single-sided welding with double-sided forming even under zero-gap assembly and without backing plates, thereby obtaining acid-resistant marine pipeline with superior $H_2S$ stress corrosion resistance.

Figure 1:
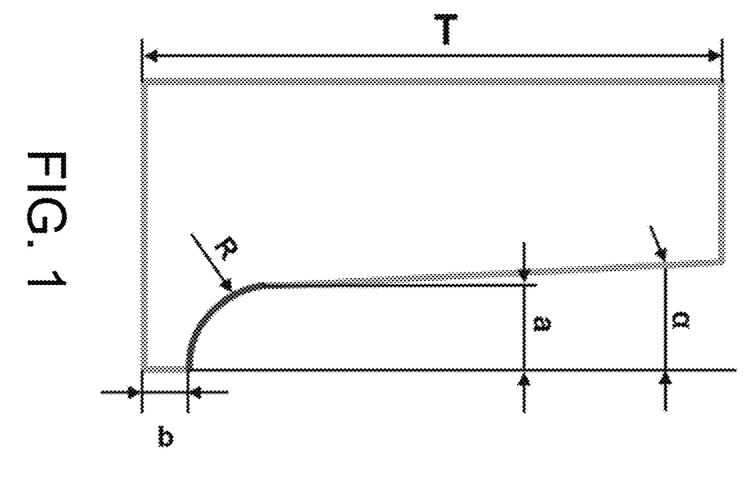
FIG. 1 is a schematic diagram of the narrow-gap U-shaped groove in the backing welding curve provided by the disclosure.
Figure 2:
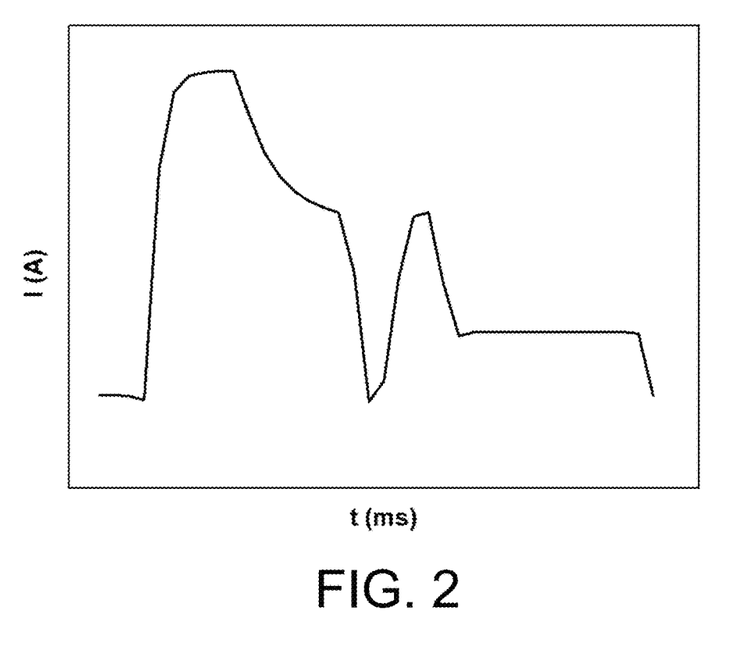
FIG. 2 shows the current waveform of the CMT reference curve used in comparative example 1 of the disclosure.

Furthermore, as shown in FIG. 1, the root face thickness b of the narrow-gap U-groove is 1.45±0.1 mm, the single-sided groove angle α is 3±0.5°, and the distance a between the top of the transition are and the root face is 2.95±0.1 mm. In a preferred embodiment of the disclosure, the transition arc radius R is 3.2 mm, and in practical applications, a suitable transition arc radius can be selected. The disclosure optimizes the parameters of the narrow-gap U-groove, making the lower part of the groove wider and the upper part narrower compared to the narrow-gap U-grooves in the prior art. The wide-bottom design can reduce the thickness of the backing weld, makes the are energy to reach the root more easily, and decrease the cooling rate of the molten pool, thereby avoiding lack of penetration defects while reducing the hardness of the backing weld. The narrow-top groove design can prevent lack of sidewall fusion defects caused by insufficient fluidity of the molten pool during the welding process.

Furthermore, compared to the CMT reference curve, the backing welding process curve increases the peak current ($I_b$) by 30%-50%, prolongs the cycle time (T) by 300%-500%, reduces the peak current rise rate (d_boostup) by 30%-50%, and decreases the peak current fall rate (d_boostdown) by 20%-40%. If the peak current and cycle time are too high, excessive heat input may cause burn-through in the backing weld; if the peak current and cycle time are too low, lack of penetration may occur in the backing weld, and the lower heat input can lead to excessive hardness. If the peak current rise rate is too high, the welding current reaches its peak too quickly, causing unstable arc conditions and poor droplet transfer. If it is too low, the welding current takes too long to reach its peak, failing to provide sufficient energy to fully penetrate the workpiece, thereby affecting welding quality. If the peak current fall rate is too high, the weld cools too rapidly, resulting in excessive hardness and worse performance of the weld; if it is too low, the weld may overheat, leading to coarse grain and affect welding performance.

Furthermore, the number of current pulses introduced before and after the short-circuit phase does not need to be identical and can be adjusted according to actual conditions. Preferably, two current pulses are introduced before and after the short-circuit phase, respectively. The duration of a single introduced current pulse ranges from 5.5 ms to 7.5 ms, with a peak pulse current of 220 A to 300 A. When the pulse current and duration are too large, the heat input increases, which can easily lead to issues such as burn-through, Solder skips, and coarse grains, affecting weld formation and performance. Conversely, when the pulse current and duration are too low, the heat input becomes insufficient, making it difficult for the heat to reach the root zone. This results in excessively high root hardness, affecting the service performance of acid-resistant marine pipelines.

According to another aspect of the disclosure, a backing welding process for acid-resistant marine pipelines is provided, specifically comprising: designing a groove of a pipeline to be welded as a narrow-gap U-groove, and then using the aforementioned backing welding process curve to weld the narrow-gap U-groove to obtain the acid-resistant marine pipeline.

The disclosure reduces the layer thickness of the backing weld through the wide-bottom design of the narrow-gap U-groove. On this basis, by increasing the peak current and cycle time, decreasing the peak current rise rate and fall rate, and introducing two current pulses before and after the short-circuiting phase in the backing welding process curve, the heat input can more easily reach the root. This increases the root weld width and reinforcement while reducing the cooling rate of the molten pool, thereby lowering the hardness of the backing weld.

According to another aspect of the disclosure, there is provided an acid-resistant marine pipeline using the aforementioned backing welding process. By employing the narrow-gap U-groove and the backing welding process curve, the disclosure achieves defect-free welding for acid-resistant marine pipelines, with the maximum joint hardness being less than 248HV10. The pipeline passes stress corrosion cracking (SSC) tests and meets all requirements for acid-resistant marine pipelines.

The disclosure is further described in detail below with embodiments.

Embodiment 1

The groove of the pipe to be welded is designed as a narrow-gap U-groove, and then the back-welding process curve is used to weld the narrow-gap U-groove to obtain acid-resistant marine pipelines, wherein:
the root face thickness b of the narrow-gap U-groove is 1.45 mm, the single-side groove angle $\alpha$ is 3°, the transition arc radius R is 3.2 mm, and the distance a between the top of the transition arc and the root face is 2.95 mm.
In the CMT reference curve, the peak current is 270 A, the cycle period is 5.5 ms, the current rise rate is 220 A/ms, and the current fall rate is 130 A/ms. Based on this CMT reference curve, the back-welding process curve increases the peak current ($I_b$) by 33.3%, prolongs the cycle time (T) by 370%, reduces the peak current rise rate (d_boostup) by 40%, and decreases the peak current fall rate (d_boostdown) by 30%. Additionally, two current pulses with a duration of 7 ms each and a peak current of 270 A are introduced before and after the short-circuit phase respectively.

Embodiment 2

The groove of the pipe to be welded is designed as a narrow-gap U-groove, and then the back-welding process curve is used to weld the narrow-gap U-groove to obtain acid-resistant marine pipelines, wherein:
the root face thickness b of the narrow-gap U-groove is 1.35 mm, the single-side groove angle $\alpha$ is 2.5°, the transition arc radius R is 3.2 mm, and the distance a between the top of the transition arc and the root face is 2.85 mm.
In the CMT reference curve, the peak current is 270 A, the cycle period is 5.5 ms, the current rise rate is 220 A/ms, and the current fall rate is 130 A/ms. Based on this CMT reference curve, the back-welding process curve increases the peak current (16) by 30%, the cycle period (T) is increased by 300%, the peak current rise rate (d_boostup) is reduced by 30%, the peak current fall rate (d_boostdown) is reduced by 20%. Additionally, two current pulses with a duration of 5.5 ms each and a peak current of 220 A are introduced before and after the short-circuiting phase respectively.

Embodiment 3

The groove of the pipe to be welded is designed as a narrow-gap U-groove, and then the back-welding process curve is used to weld the narrow-gap U-groove to obtain acid-resistant marine pipelines, wherein:
the root face thickness b of the narrow-gap U-groove is 1.55 mm, the single-side groove angle $\alpha$ is 3.5°, the transition arc radius R is 3.2 mm, and the distance a between the top of the transition arc and the root face is 3.05 mm.
In the CMT reference curve, the peak current is 270 A, the cycle period is 5.5 ms, the current rise rate is 220 A/ms, and the current fall rate is 130 A/ms. Based on this CMT reference curve, the back-welding process curve increases the peak current ($I_b$) by 50%, the cycle period (T) is increased by 500%, the peak current rise rate (d_boostup) is reduced by 50%, the peak current fall rate (d_boostdown) is reduced by 40%. Additionally, two current pulses with a duration of 7.5 ms each and a peak current of 300 A are introduced before and after the short-circuiting phase respectively.

Embodiment 4

The groove of the pipe to be welded is designed as a narrow-gap U-groove, and then the back-welding process curve is used to weld the narrow-gap U-groove to obtain acid-resistant marine pipelines, wherein:
the root face thickness b of the narrow-gap U-groove is 1.45 mm, the single-side groove angle $\alpha$ is 3°, the transition arc radius R is 3.2 mm, and the distance a between the top of the transition arc and the root face is 2.95 mm.
In the CMT reference curve, the peak current is 270 A, the cycle period is 5.5 ms, the current rise rate is 220 A/ms, and the current fall rate is 130 A/ms. Based on this CMT reference curve, the back-welding process curve increases the peak current ($I_b$) by 40%, the cycle period (T) is increased by 400%, the peak current rise rate (d_boostup) is reduced by 40%, the peak current fall rate (d_boostdown) is reduced by 30%. Additionally, two current pulses with a duration of 6.5 ms each and a peak current of 260 A are introduced before and after the short-circuiting phase respectively.

Comparative Example 1

The groove of the pipe to be welded is designed as a narrow-gap U-groove, and then the narrow-gap U-groove is welded using the CMT reference curve in embodiment 1 to obtain acid-resistant marine pipelines, wherein the narrow-gap U-groove is the same as that in embodiment 1.

Hardness tests are conducted on the welds obtained in embodiment 1 and comparative example 1. The test locations are 2 mm below the top base metal, the middle of the weld, and 2 mm above the bottom base metal. The test force is 10 kN, the holding time is 15s, the test spacing in the heat-affected zone is 1 mm, and the test spacing in the base metal and weld center is 2 mm. Stress corrosion cracking (SSC) tests are performed on the welds, with a test duration of 30 days, $H_2S$ concentration greater than 2300 mg/L, applied stress not less than 80% of the actual yield strength (AYS), and the test temperature is 24±3° C.

Figure 3:
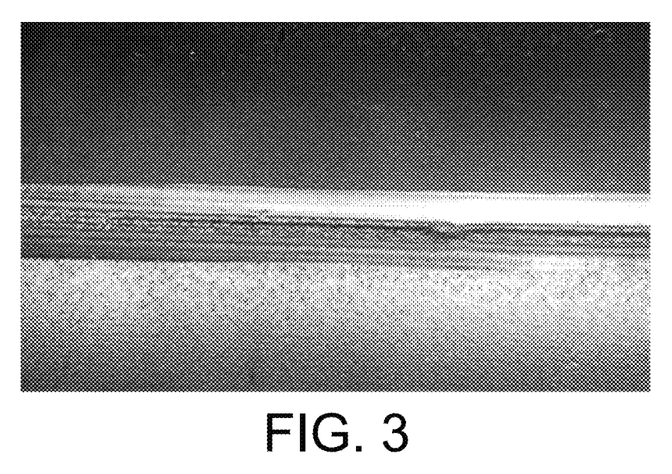
FIG. 3 illustrates the root pass formation of the acid-resistant marine pipeline obtained in comparative example 1 of the disclosure.
Figure 4:
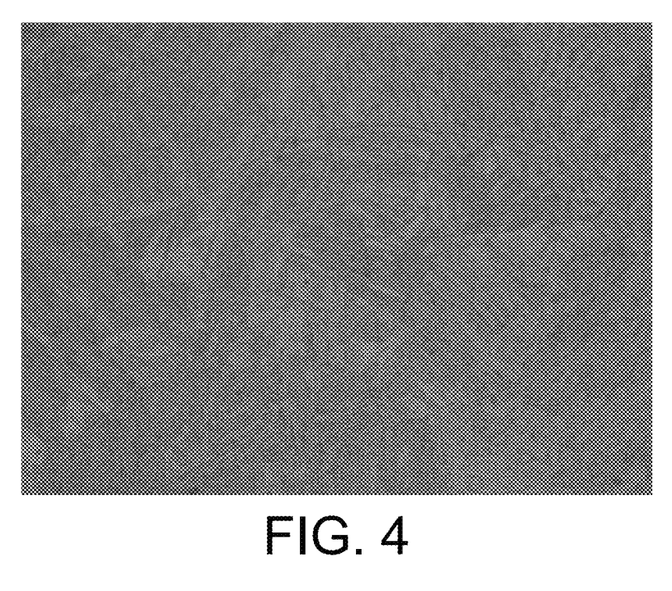
FIG. 4 shows the weld microstructure of the acid-resistant marine pipeline obtained in comparative example 1 of the disclosure.
Figure 5:
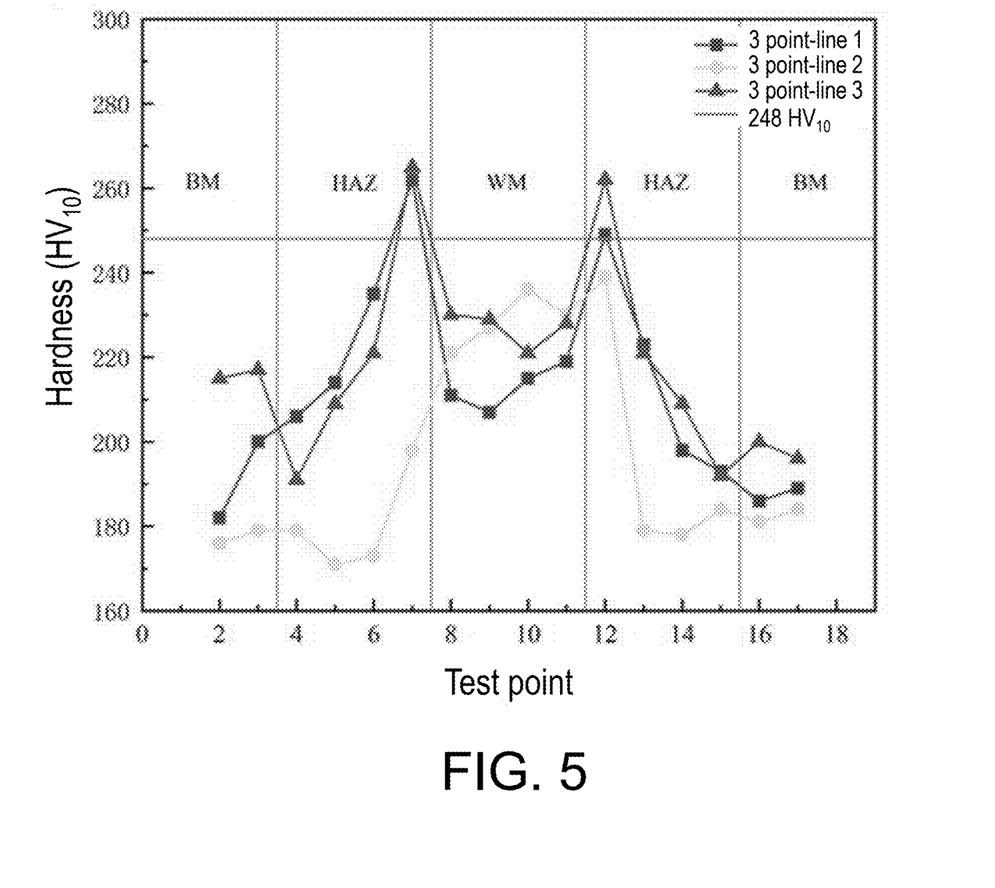
FIG. 5 presents the weld hardness test results of the acid-resistant marine pipeline obtained in the comparative example 1 of the disclosure.
Figure 6:
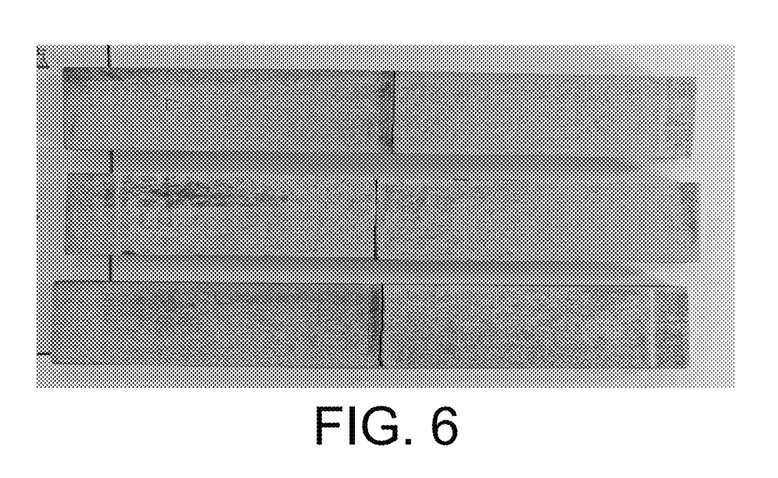
FIG. 6 displays the weld SSC test results of the acid-resistant marine pipeline obtained in comparative example 1 of the disclosure.
Figure 7:
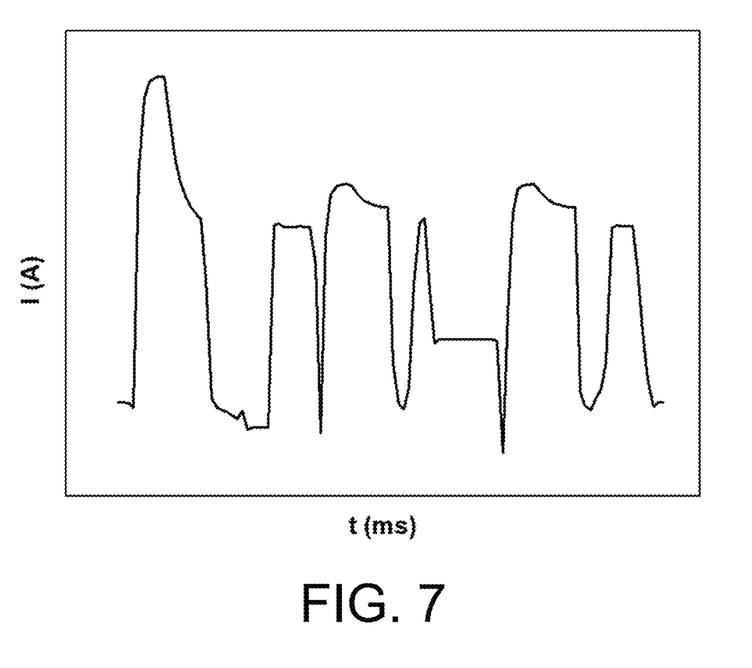
FIG. 7 shows the current waveform of the backing welding curve used in embodiment 1 of the disclosure.

As shown in FIG. 3, the root pass of comparative example 1 exhibits significant concavity in the overhead welding zone. As shown in FIG. 4, due to excessively rapid cooling, the weld microstructure consists of coarse martensite, resulting in a root pass hardness significantly exceeding 248 HV10, as shown in FIG. 5. Moreover, after 30 days of SSC testing, the weld cracked, as shown in FIG. 6.

Figure 8:
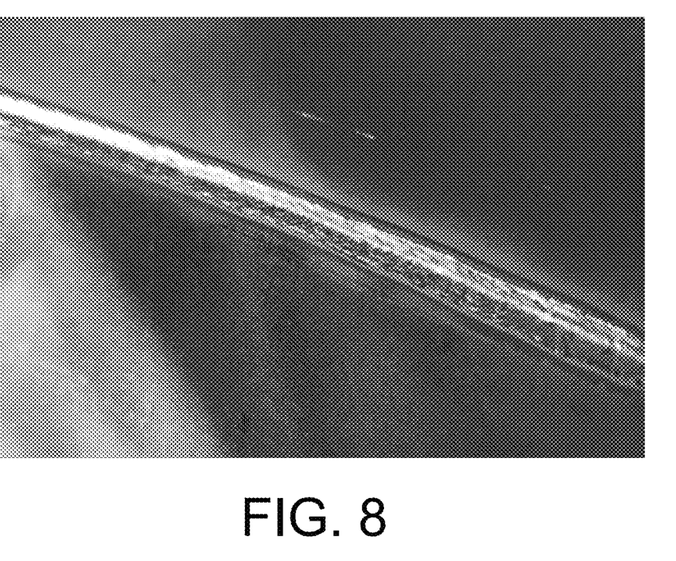
FIG. 8 illustrates the root pass formation of the acid-resistant marine pipeline obtained in embodiment 1 of the disclosure.
Figure 9:
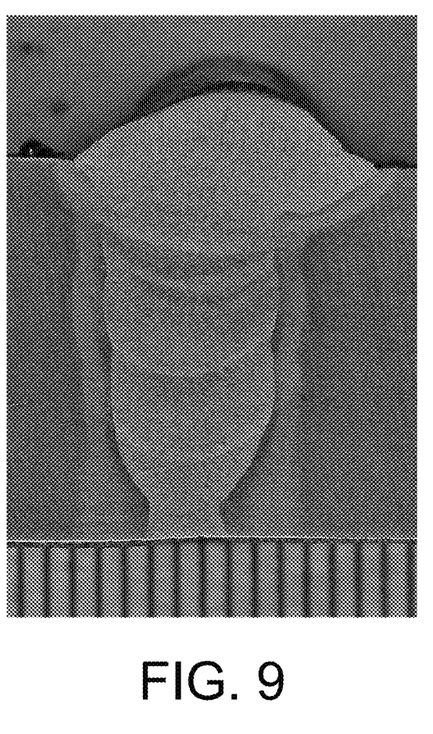
FIG. 9 shows the weld formation of the acid-resistant marine pipeline obtained in embodiment 1 of the disclosure.

The root pass welding process curve in embodiment 1 increases the heat input and energy by raising the peak current and its duration, ensuring uniform penetration while enhancing arc thrust to promote droplet transfer; by reducing the current rise rate during the acceleration phase and slowing the current fall rate afterward, the arc's impact on the molten pool is prolonged, thereby more molten metal is extruded to the root of the weld and spread out. The resulting root pass effect is shown in FIG. 8: the molten metal is extruded to the weld root, forming a reinforcement and its transition with the base metal is uniform and smooth. As shown in FIG. 9, the weld exhibits excellent formation with consistent layer thickness, free from defects such as lack of fusion, root concavity, porosity, or cracks.

Figure 10:
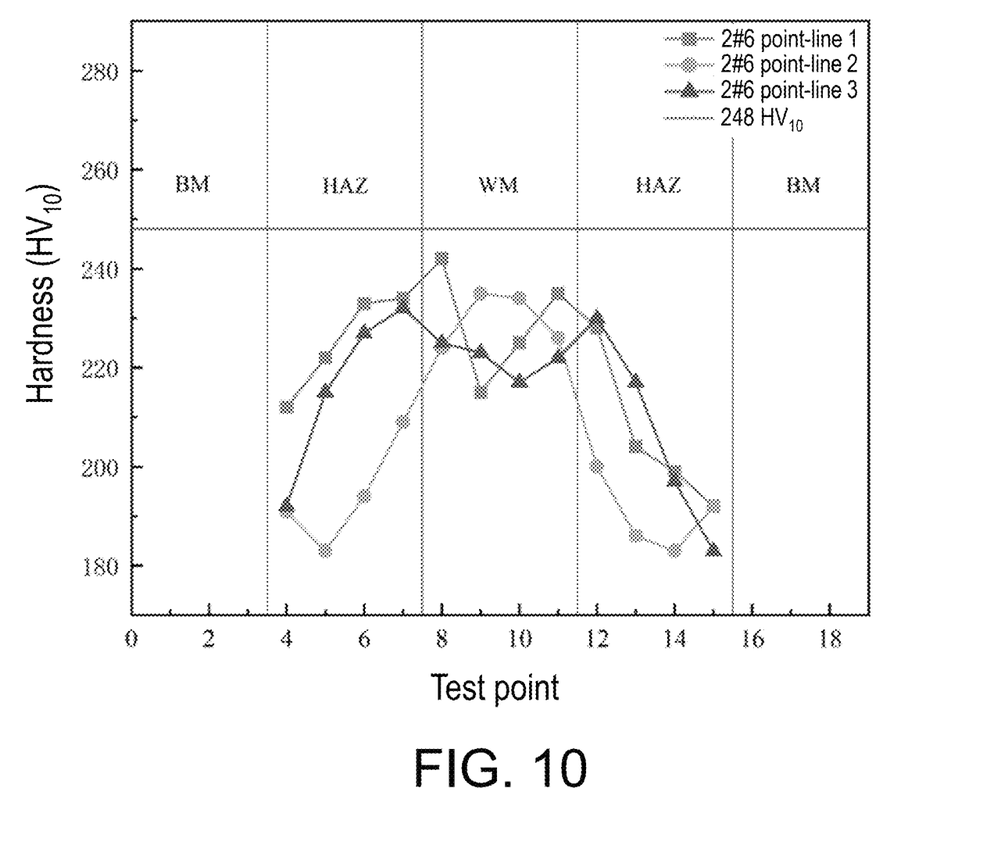
FIG. 10 shows the weld hardness test results of the acid-resistant marine pipeline obtained in embodiment 1 of the disclosure.
Figure 11:
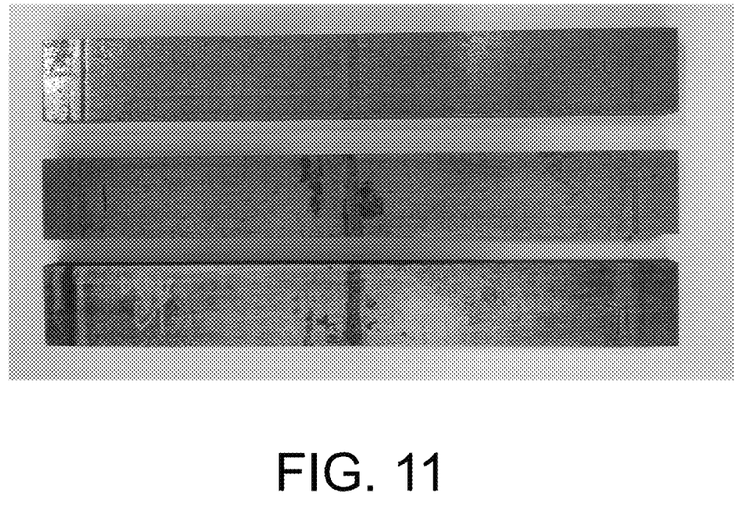
FIG. 11 shows the weld SSC test results of the acid-resistant marine pipeline obtained in embodiment 1 of the disclosure.

The wide bottom design of the narrow-gap U-groove can reduce the layer thickness of the root pass. On this basis, by increasing the peak current and its duration, decreasing the peak current rise rate and current fall rate, and introducing two current pulses before and after the short-circuit phase through the aforementioned root welding process curve, the increased heat input can more easily reach the root. This simultaneously increases the root fusion width and reinforcement height while reducing the cooling rate of the molten pool. The weld fully melts, cools, and solidifies, thereby reducing the hardness of the root pass and improving the service performance of the acid-resistant marine pipelines. As shown in FIGS. 10 and 11, the weld hardness is less than 248 HV10, and no cracking occurs after 30 days of SSC testing.

It will be easily understood by those skilled in the art that the above description is only a preferred embodiment of the disclosure and is not intended to limit the disclosure. Any modifications, equivalent substitutions, and improvements made within the spirit and principles of the disclosure shall be included in the scope of the disclosure.

What is claimed is:

1. A method of using a backing welding process curve for a narrow-gap U-groove, comprising:
   designing a groove of a pipe to be welded as the narrow-gap U-groove; and
   welding the narrow-gap U-groove by using the backing welding process curve,
   wherein
   in the narrow-gap U-groove, a root face thickness b is 1.45±0.1 mm, a single-side groove angle α is 3±0.5°, and a distance a between a transition arc top and a root face is 2.95±0.1 mm,
   the backing welding process curve is obtained by adjusting a Cold Metal Transfer (CMT) reference curve,
   in the CMT reference curve, a peak current is 270 A, a cycle time is 5.5 ms, a current rise rate is 220 A/ms, and a current fall rate is 130 A/ms, and
   in the backing welding process curve, the peak current increases by 30%-50% and the cycle time extends by 300%-500% to enhance a welding heat input, the current rise rate reduces by 30%-50% and the current fall rate reduces by 20%-40% to prolong a peak current action time, and two current pulses before and after a short-circuit phase are introduced in the narrow-gap U-groove respectively to increase a root weld width of the narrow-gap U-groove and to avoid a root concavity of the narrow-gap U-groove, wherein a duration of an introduced single current pulse is 5.5 ms to 7.5 ms, and a pulse peak current is 220 A to 300 A.

2. An acid-resistant marine pipeline produced by the method of using the backing welding process curve for the narrow-gap U-groove according to claim 1.

* * * * *